UNITED STATES PATENT OFFICE.

GEORGE LEONARD CROUDACE, OF BALMAIN, NEAR SYDNEY, NEW SOUTH WALES, AUSTRALIA.

MANUFACTURE OF COAL BRIQUETS.

No. 828,999.　　　Specification of Letters Patent.　　　Patented Aug. 21, 1906.

Application filed May 15, 1905. Serial No. 260,569.

*To all whom it may concern:*

Be it known that I, GEORGE LEONARD CROUDACE, a subject of the King of Great Britain and Ireland, and a resident of 86 Glassop street, Balmain, near Sydney, in the State of New South Wales, Commonwealth of Australia, have invented a certain new and useful Improved Manufacture of Coal Briquets, of which the following is a specification.

The constituents to form the briquets will be starch and flour, silicate of soda, cold water, boiling water, small coal, and slaked lime. A thin paste is first made in the following manner, viz: About fifty pounds starch and flour is thoroughly mixed with about ten gallons of cold water. This mixture is then added to about one hundred gallons of boiling water, and the whole must be stirred and kept boiling until the starch or flour is thoroughly cooked and incorporated with the water. To the boiled mixture a proportion of about five pounds of silicate of soda will be added.

One ton of small coal and from twenty-five to twenty-eight pounds of ground slaked lime are reduced and thoroughly mixed together in a mill. Each ton of the coal mixture must be mixed with about ten gallons of the pasty flour and starch mixture and the whole thoroughly incorporated together. The incorporated mass will then be placed in a brick-press and molded therein into briquets. The briquets will then be stacked under cover to dry, or artificial heat may be used for this purpose.

The solution will bind and harden the coal-dust when it is made up into briquets. It has the further effect of preventing the escape of a large proportion of the volatile carbon in the coal, rendering the briquets almost smokeless when burning.

Having now described my invention, what I claim as new, and desire to secure by Letters Patent, is—

The herein-described process of making briquets consisting in mixing together small coal and slaked lime and then mixing said coal and lime with a thin pasty mixture, said mixture consisting of starch and flour boiled in water, adding silicate of soda to said pasty mixture and finally molding the mass into briquets.

In witness whereof I have hereunto set my hand in presence of two witnesses.

GEORGE LEONARD CROUDACE.

Witnesses:
　MANFIELD NEWTON,
　ALBERT MASSEY.